(12) United States Patent
Mizuki et al.

(10) Patent No.: US 10,245,516 B2
(45) Date of Patent: Apr. 2, 2019

(54) INFORMATION-PROCESSING SYSTEM, SERVER DEVICE, INFORMATION-PROCESSING DEVICE, STORAGE MEDIUM, AND INFORMATION-PROCESSING METHOD

(71) Applicant: NINTENDO CO., LTD., Kyoto (JP)

(72) Inventors: Kiyoshi Mizuki, Kyoto (JP); Hideto Yuzawa, Kyoto (JP); Shunsaku Kato, Kyoto (JP); Ryota Oiwa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 285 days.

(21) Appl. No.: 14/189,324

(22) Filed: Feb. 25, 2014

(65) Prior Publication Data

US 2015/0005065 A1   Jan. 1, 2015

(30) Foreign Application Priority Data

Jun. 28, 2013  (JP) .................................. 2013-136491

(51) Int. Cl.
  *A63F 13/87*  (2014.01)
  *A63F 13/323*  (2014.01)

(52) U.S. Cl.
  CPC ............ *A63F 13/87* (2014.09); *A63F 13/323* (2014.09)

(58) Field of Classification Search
  USPC ........................................ 463/29, 30, 31, 32
  See application file for complete search history.

(56) References Cited

U.S. PATENT DOCUMENTS

| | | | |
|---|---|---|---|
| 2004/0224741 A1 | 11/2004 | Jen et al. | |
| 2006/0080702 A1 | 4/2006 | Diez | |
| 2006/0166743 A1 | 7/2006 | Kogo | |
| 2009/0307003 A1* | 12/2009 | Benyamin | G06Q 30/02 705/319 |
| 2010/0241971 A1* | 9/2010 | Zuber | G06Q 10/10 715/753 |
| 2013/0144956 A1 | 6/2013 | Sakai | |
| 2013/0237300 A1* | 9/2013 | Johnson | G07F 17/3255 463/13 |

(Continued)

FOREIGN PATENT DOCUMENTS

| | | |
|---|---|---|
| JP | 2003-320164 | 11/2003 |
| JP | 2004-329950 | 11/2004 |

(Continued)

OTHER PUBLICATIONS

Mizuki et al., Office Action dated Nov. 5, 2015, issued in copending U.S. Appl. No. 14/189,290, filed Feb. 25, 2014 (11 pages).

*Primary Examiner* — Pierre E Elisca
(74) *Attorney, Agent, or Firm* — Nixon & Vanderhye P.C.

(57) ABSTRACT

An example information-processing system includes: at least one processor; and an input device configured to receive an input operation performed by a user directed to posting information displayed by a display. The at least one processor is configured to: display first information that is displayed by executing an application on the display, and the posting information that is posted using a posting information sharing service, and that is associated with the application; and reflect the input operation received by the input device in the posting information sharing service.

23 Claims, 7 Drawing Sheets

(56) References Cited

U.S. PATENT DOCUMENTS

| | | | |
|---|---|---|---|
| 2013/0274001 A1* | 10/2013 | de Jesus | A63F 13/12 463/25 |
| 2013/0324257 A1 | 12/2013 | Mizuki | |
| 2013/0325957 A1 | 12/2013 | Mizuki | |
| 2014/0187314 A1 | 7/2014 | Perry | |

FOREIGN PATENT DOCUMENTS

| | | |
|---|---|---|
| JP | 2006-204441 | 8/2006 |
| JP | 2010-35968 | 2/2010 |
| JP | 2011-253452 | 12/2011 |
| JP | 2013-59569 | 4/2013 |
| JP | 2013-61889 | 4/2013 |

* cited by examiner

US 10,245,516 B2

INFORMATION-PROCESSING SYSTEM, SERVER DEVICE, INFORMATION-PROCESSING DEVICE, STORAGE MEDIUM, AND INFORMATION-PROCESSING METHOD

CROSS-REFERENCE TO RELATED APPLICATIONS

This application is based on and claims priority under 35 U.S.C. 119 from Japanese Patent Application No. 2013-136491, which was filed on Jun. 28, 2013.

FIELD

The technology herein relates to linking an application such as a game with posting information relevant to the application.

BACKGROUND AND SUMMARY

Known in the art is a technique of controlling the progress of a game based on the number of responses to information automatically posted to a posting site by a game machine.

The present disclosure provides an information-processing system including: at least one processor; and an input device configured to receive an input operation performed by a user directed to the posting information displayed by the display, the at least one processor configured to: display first information that is displayed by executing an application on the display, and the posting information that is posted using a posting information sharing service, and that is associated with the application; and reflect the input operation received by the input device in the posting information sharing service.

DETAILED DESCRIPTION OF NON-LIMITING EXAMPLE EMBODIMENTS

Figure 1:
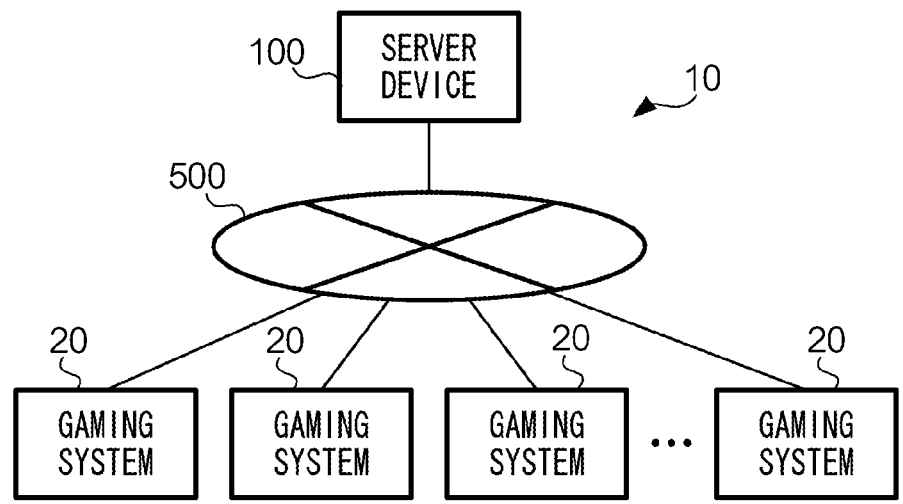
FIG. 1 shows a non-limiting example of a configuration of an information-processing system.

FIG. 1 shows a non-limiting example of a configuration of information sharing system 10. Information sharing system 10 is a system for execution of a variety of games and for sharing of posting information related to the games. Information sharing system 10 has a function of executing a game and a function of sharing posting information. As used herein, the term "game" is used to refer to an example of application software (hereinafter referred to as "application"), which application may include an action game, a shooting game, a role-playing game, and a puzzle game.

Information sharing system 10 includes server device 100 and plural gaming systems 20, which are interconnected via network 500. Network 500 is, for example, the Internet; however, network 500 may be any other network.

Server device 100 is a computer device that provides a service of sharing posting information (hereinafter "information sharing service"). Server device 100 receives posting information from plural gaming systems 20, and enables users to share posting information in accordance with a predetermined rule(s). Server device 100 may receive posting information from a device other than gaming system 20.

Figure 2:
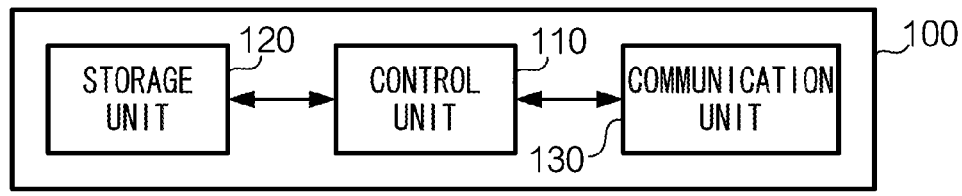
FIG. 2 shows a non-limiting example of a hardware configuration of a server device.

FIG. 2 shows a non-limiting example of a hardware configuration of server device 100. Server device 100 includes control unit 110, storage unit 120, and communication unit 130. Control unit 110 is a unit that controls operations of server device 100. Control unit 110 includes a processor such as a CPU (Central Processing Unit) and a main memory, by which operations of components of server device 100 are controlled upon execution of a program. Storage unit 120 is a unit that stores data. Storage unit 120 includes a storage medium such as a hard disk for storage of data such as posting information. Communication unit 130 is a unit that connects to network 500 for exchange of data with gaming system 20.

It is to be noted that data used by server device 100 may be stored in an external storage device, rather than in a storage device provided in server device 100 such as storage unit 120. It also is noted that functions of server device 100 may be provided upon cooperation of plural devices such as elements of a server group, rather than by a single device alone.

Gaming system 20 is an information-processing system, which may be installed in a user's home, and may be used by a single user or shared by plural users such as family members. In a case where gaming system 20 is shared by plural users, each user is identified by way of predetermined authentication processing such as password authentication.

Figure 3:
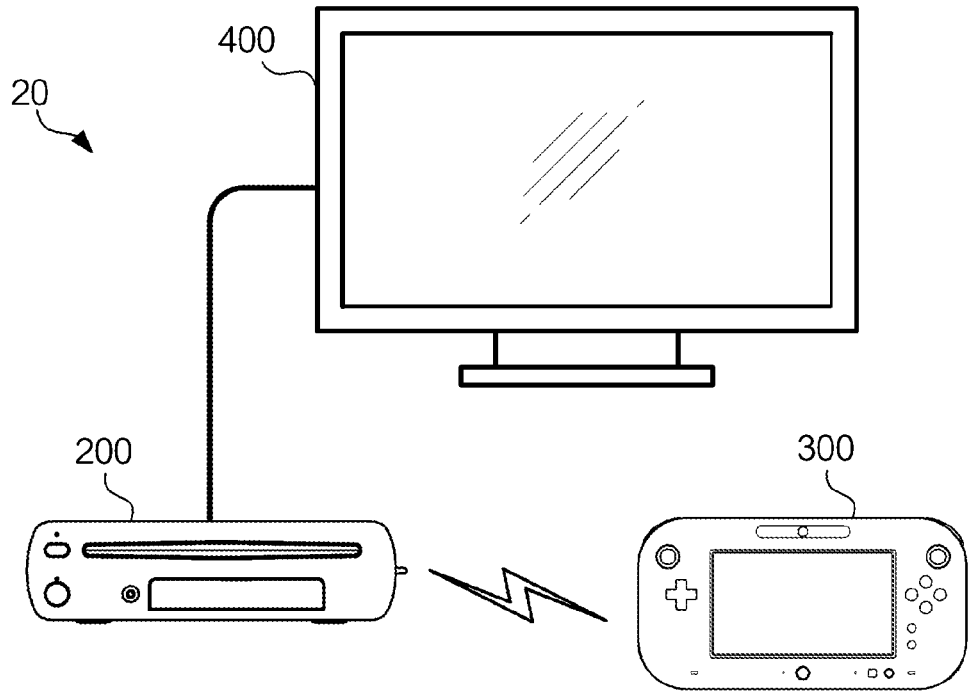
FIG. 3 shows a non-limiting example of a configuration of equipment of a gaming system.

FIG. 3 shows a non-limiting example of a configuration of equipment of gaming system 20. Gaming system 20 includes main device 200, controller 300, and TV 400. In the present exemplary embodiment, gaming system 20 includes single controller 300; however, gaming system 20 may include plural controllers 300. Furthermore, gaming system 20 may, in addition to controller 300, include another controller for inputting characters, for use in a game.

Main device 200 is an information-processing device that executes a game, and provides an interface for a user to use an information sharing service. Main device 200 is connected to network 500, and performs a processing necessary for executing a game and also processing necessary for using an information sharing service. Main device 200 also performs display control of controller 300 and TV 400.

Controller 300 is a portable input terminal that is held and operated by a user. Controller 300 includes a touch-screen display area, and thus also serves as a display device. In the present exemplary embodiment, controller 300 exchanges data wirelessly with main device 200; however, controller 300 may have a wired connection to main device 200.

TV 400 is a display device that displays a game screen and posting information. TV 400 is connected to main device 200, and displays an image under control of main device 200. Gaming system 20 may include, instead of TV 400, any other display device such as a projector.

Figure 4:
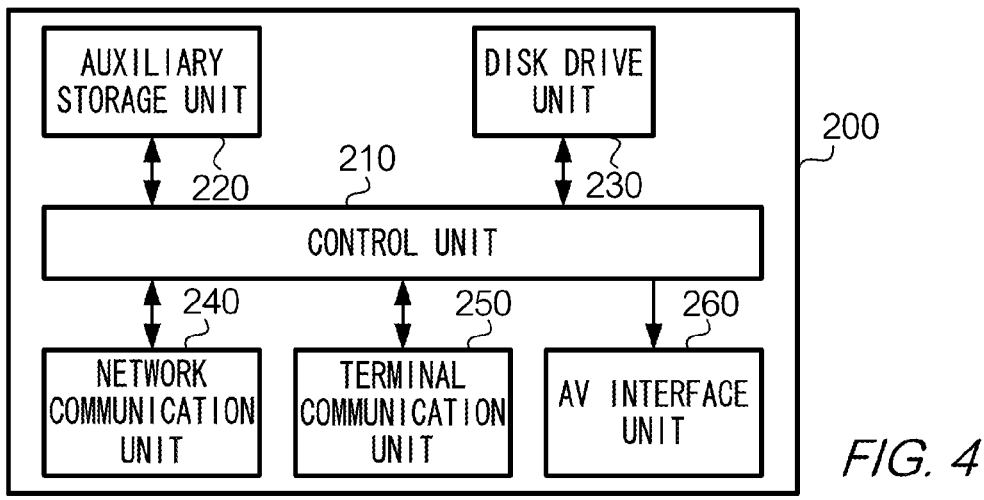
FIG. 4 shows a non-limiting example of a hardware configuration of a main device.

FIG. 4 shows a non-limiting example of a hardware configuration of main device 200. Main device 200 includes control unit 210, auxiliary storage unit 220, disk drive unit 230, network communication unit 240, terminal communication unit 250, and AV (Audio and Visual) interface unit 260.

Control unit 210 is a unit that controls operations of components of main device 200. Control unit 210 includes a processor such as a CPU or a GPU (Graphics Processing Unit), a memory such as a main memory or a VRAM (Video Random Access Memory), and an input/output interface for exchanging data with components of main device 200. Control unit 210 controls generation of image data to be sent to controller 300 or TV 400, by executing a program. Control unit 210 also controls communication with server device 100, and controls exchange and display of posting information. Exchange and display of posting information may be realized by use of a general-purpose application such as a Web browser or by use of a dedicated application.

Auxiliary storage unit 220 is a unit that stores data used by control unit 210. Auxiliary storage unit 220 is, for example, a flash memory or a hard disk. Alternatively, auxiliary storage unit 220 may be a combination of a detachable recording medium such as a memory card and a reader/writer. Auxiliary storage unit 220 may store programs to be executed by control unit 210 or data acquired via network communication unit 240 or terminal communication unit 250. For example, auxiliary storage unit 220 may store data on a game, which is sold online and has been downloaded, so that the game can be executed when needed.

Disk drive unit 230 is a unit that reads data stored in an optical recording medium such as an optical disk. The optical disk may be used for storage of data necessary for executing a game program. Disk drive unit 230 may read data stored on any other recording medium such as a magneto-optical disk or a semiconductor memory.

Network communication unit 240 is a unit that communicates with network 500. Network communication unit 240 exchanges data with server device 100 under control of control unit 210. Terminal communication unit 250 is a unit that communicates with controller 300. Terminal communication unit 250 may perform wireless communication by using a communication system such as Wi-Fi (Registered Trademark), Bluetooth (Registered Trademark), or infrared.

AV interface unit 260 is a unit that provides image data and audio data to TV 400. AV interface unit 260 includes one or more interfaces such as an HDMI (High-Definition Multimedia Interface) (Registered Trademark) terminal or a component terminal.

Figure 5:
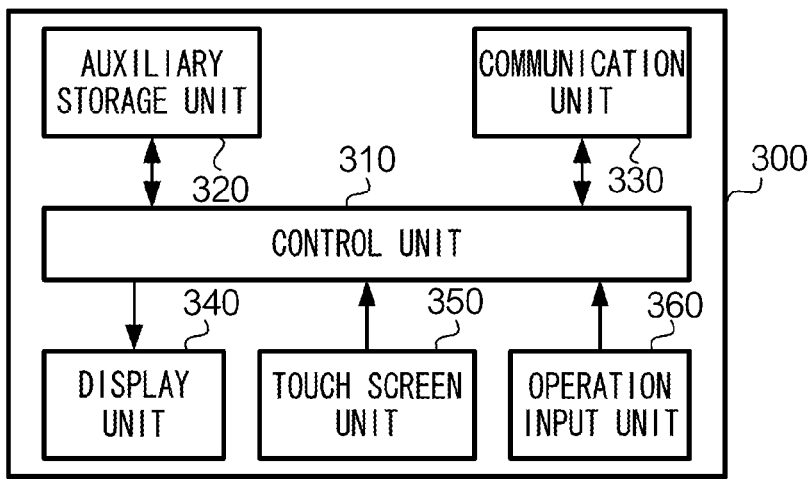
FIG. 5 shows a non-limiting example of a hardware configuration of a controller.

FIG. 5 shows a non-limiting example of a hardware configuration of controller 300. Controller 300 includes control unit 310, auxiliary storage unit 320, communication unit 330, display unit 340, touch screen unit 350, and operation input unit 360.

Control unit 310 is a unit that controls operations of components of controller 300. Control unit 310 includes a processor such as a CPU, a main memory, and an input/output interface for exchanging data with components of controller 300. Control unit 310 controls display of an image or exchange of data with main device 200, by executing a program.

Auxiliary storage unit 320 is a unit that stores data used by control unit 310. Auxiliary storage unit 320 is, for example, a flash memory. Alternatively, auxiliary storage unit 320 may be a combination of a detachable recording medium such as a memory card and a reader/writer.

Communication unit 330 is a unit that communicates with main device 200. Communication unit 330 includes an antenna for performing wireless communication with main device 200.

Display unit 340 is a unit that displays an image. Display unit 340 includes a display panel composed of pixels of a liquid crystal element or an organic EL (electroluminescence) element, and a drive circuit for driving the display panel. Display unit 340 displays an image in a predetermined display area of the display panel based on image data provided by control unit 310.

Touch screen unit 350 is a unit that detects an input operation performed by a user. Touch screen unit 350 generates and outputs coordinate information indicative of a position in a display area of display unit 340. Touch screen unit 350 includes a sensor provided on top of the display area, and a control circuit that generates coordinate information indicative of a position detected by the sensor, and provides the coordinate information to control unit 310. A method in which touch screen unit 350 detects a position may be a resistance film method, an electrostatic capacitance method, or any other method. A user may perform an input operation by use of his/her finger or by use of a pen-type instrument such as a stylus. An input operation performed to touch screen unit 350 by a user may include an input operation to draw handwritten characters or illustrations.

Operation input unit 360 is another unit that detects an input operation performed by a user. Operation input unit 360 includes selectable keys and switches, and provides control unit 310 with input operation information (for example, information indicative of whether a key is selected) corresponding to a user's input operation. Operation input unit 360 may include any number of keys and switches. Operation input unit 360 may include a keyboard or a pointing device such as a mouse.

The foregoing is a description of a hardware configuration of information sharing system 10. By using the thus-configured information sharing system 10, a user may play a game or exchange information within a community that is related to the game. A function for playing a game is provided mainly by each gaming system 20. An information sharing service is provided by cooperation of plural gaming systems 20 and server device 100.

An information sharing service according to the present exemplary embodiment is a service of sharing, among plural users, posting information in relation to a game between plural users. In the information sharing service, posting information may be shared for each of plural games; and the posting information is managed by use of a bulletin board, more specifically an electronic bulletin board.

In the present exemplary embodiment, posting information is managed by a unit referred to herein as a "community." The term "community" as used herein refers to a group associated with a game. Each community has one bulletin board. Plural communities may exist for one game. A user may belong to one or more communities, and may post information on a bulletin board of a community to which s/he belongs. Browsing of information posted on a bulletin board of a community may be restricted to users belonging to the community; alternatively, users not belonging to the community may be allowed to browse the information.

Server device 100 manages posting information on a community basis, and sends posting information to gaming system 20 so that gaming system 20 may display the posting information. Server device 100 also manages user information. The user information herein refers to information relevant to a user. Posting information and user information are data necessary for providing an information sharing service.

Figure 6:
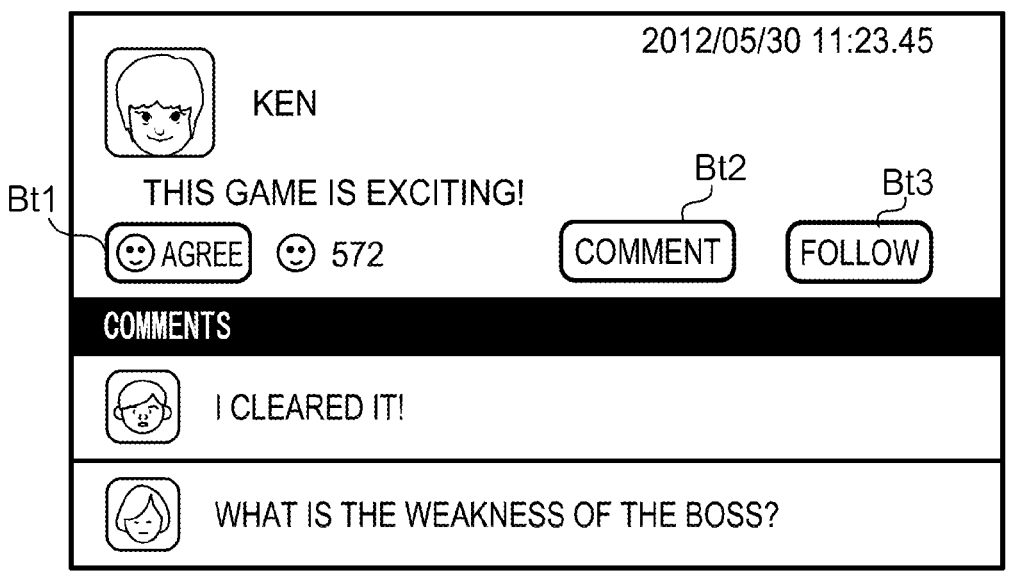
FIG. 6 shows a non-limiting example of a display of posting information.

FIG. 6 shows a non-limiting display example of posting information. Posting information may include, in addition to a message body, a character string (in the present example embodiment, "Ken") and an icon for identifying a contributor, and a posting date and time. In the present display example, agree button Bt1, comment button Bt2, and follow button Bt3 are displayed in a display area for posting information. Agree button Bt1 consists of an image that is selectable by a user, who has browsed and is in agreement with posting information. A total number of users who have agreed with the posting information (hereinafter, "agree count") may be displayed near agree button Bt1. Comment button Bt2 consists of an image selectable by a user, who has browsed posting information and intends to respond or reply to the posting information.

A user, by selecting comment button Bt2 to input characters, may make a comment on information posted by a contributor. Such a comment is one example of an item of posting information that may be associated with another item of posting information. A user may make a comment on a comment made by a contributor. Thus, posting information may have a hierarchical structure.

In the following description, an agreement and a comment made by a user will be referred to collectively as a "reaction." As used herein the term "reaction" refers to an attitude of a user expressed toward posting information. Such a reaction is not limited to an agreement or a comment, and may indicate either a positive or negative impression, or may consist of an evaluation of posting information expressed by use of a score or star rating.

Follow button Bt3 consists of an image selected when a user browsing posting information follows a contributor of the posting information. As used herein the term "follow" refers to an example of a relationship between users. If a user follows another user, the user is able preferentially to acquire posting information posted by the other user. Generally speaking, such a user is treated differently in the information sharing service from a user who does not follow the other user. When a user follows another user, it is not necessary to gain consent from the other user. When a user browsing posting information already is following a contributor of posting information, follow button Bt3 may not be displayed, or may be displayed in grayout so that the button cannot be selected by the user.

Figure 7:
FIG. 7 shows a non-limiting example of a data structure of posting information.

FIG. 7 shows a non-limiting example of a data structure of posting information. Posting information according to the present exemplary embodiment includes a posting ID, game ID, community ID, user ID, a posting date and time, a message body, a spoiler flag, a topic tag, comment information, and agreement information.

The posting ID consists of information for identifying the posting information. The community ID is information for identifying a community having a bulletin board on which the posting information is posted. The game ID is information for identifying a game associated with the community identified by the community ID. The user ID is information pre-assigned to a user to identify him/her. In the present exemplary embodiment, the user ID is used to identify a contributor of posting information.

The posting date and time consists of information that indicates each of a date and time when the posting information was posted. The message body consists of information in the form of characters and symbols input by a user. The message body may include text data or image data indicative of a screen shot of a game or an illustration handwritten by a user.

The spoiler flag consists of information indicative of whether the posting information includes a spoiler. As used herein the term "spoiler" refers to a piece of information that reveals a climax or ending of a game, and consists of game content that a user would not want to know beforehand. A determination as to whether posting information includes a spoiler may be made by a contributor of the posting information, and expressed by checking or unchecking a checkbox displayed on a screen for inputting posting information. Alternatively, the determination may be made based on a report provided from a user other than the contributor, who has browsed the posting information. Alternatively, an operator of the information sharing service or a manager of a community may censor items of posting information to determine whether each item of posting information includes a spoiler. A spoiler flag "1" means that posting information includes a spoiler, and a spoiler flag "0" means that posting information does not include a spoiler.

The topic tag consists of information that indicates the topic of the posting information. The topic tag is added to the posting information, and corresponds to a topic of the posting information. The topic tag may be a character string. The topic tag may be added by a contributor of the posting information. In the present exemplary embodiment, the topic tag is added to posting information especially when during-game posting (described later) is performed.

The comment information and the agreement information consist of information on reaction(s) made to the posting information. The comment information may include at least one of a number of user(s) who have commented on the posting information, user ID(s) of the user(s), and comment(s) (or ID(s) of the comment(s)). The agreement information may include at least one of the number of agreement(s) and user ID(s) of user(s) who have agreed to the posting information.

Posting information is not limited to the example shown in FIG. 7. Posting information may include additional data, or may not include a portion of the data shown in FIG. 7. A portion of posting information may be added only when a predetermined condition is satisfied; otherwise, the portion may be omitted. For example, posting information to which no comment is made by a user does not include comment information.

Figure 8:
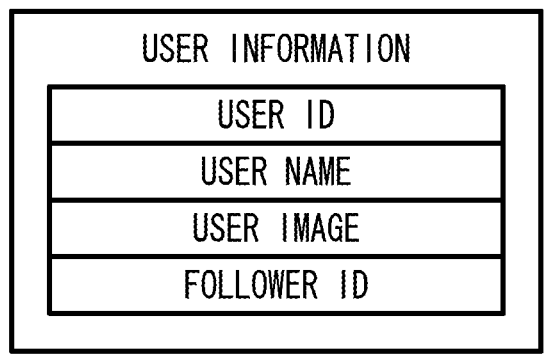
FIG. 8 shows a non-limiting example of a data structure of user information.

FIG. 8 shows a non-limiting example of a data structure of user information. The user information according to the present exemplary embodiment includes user ID, a user name, a user image, and follower ID(s). The user information may include additional data such as a user's gender or age (or a birth date).

The user ID is data similar to user ID included in posting information. The user ID is used for identifying the user information. The user name is information for identifying a user in the information sharing service. The user name may be a real name of the user, or may be a pseudonym or nickname to protect the privacy of the user. The user image is another piece of information for identifying the user. The user image may be an image such as an icon shown in FIG.

6. Alternatively, the user image may be a three-dimensional object such as an avatar arranged in a three-dimensional virtual space.

The follower ID is the user ID of a user, who is a follower of the user identified by the user ID. The term "follower" herein refers to a user who follows another user. The user information may include, in place of or in addition to a user ID of a follower of the user, a user ID of a user followed by the user.

A user may post or browse posting information using gaming system 20. For example, a user, when having come to a stalemate in a game, may ask for advices by posting an inquiry on a bulletin board of the game's community. In another example, a user, when having satisfied a predetermined condition while playing a game such as achieving a high score, may post posting information.

A user may also browse posting information, and proceed with a game with reference to the posting information. A user may also check the reputation of a game before purchasing the game. In the present exemplary embodiment, a user may browse posting information while playing a game. Gaming system 20 may recognize a game being played by a user, and acquire posting information posted on a bulletin board of a community directed to the game from server device 100 to display the posting information.

Figure 9:
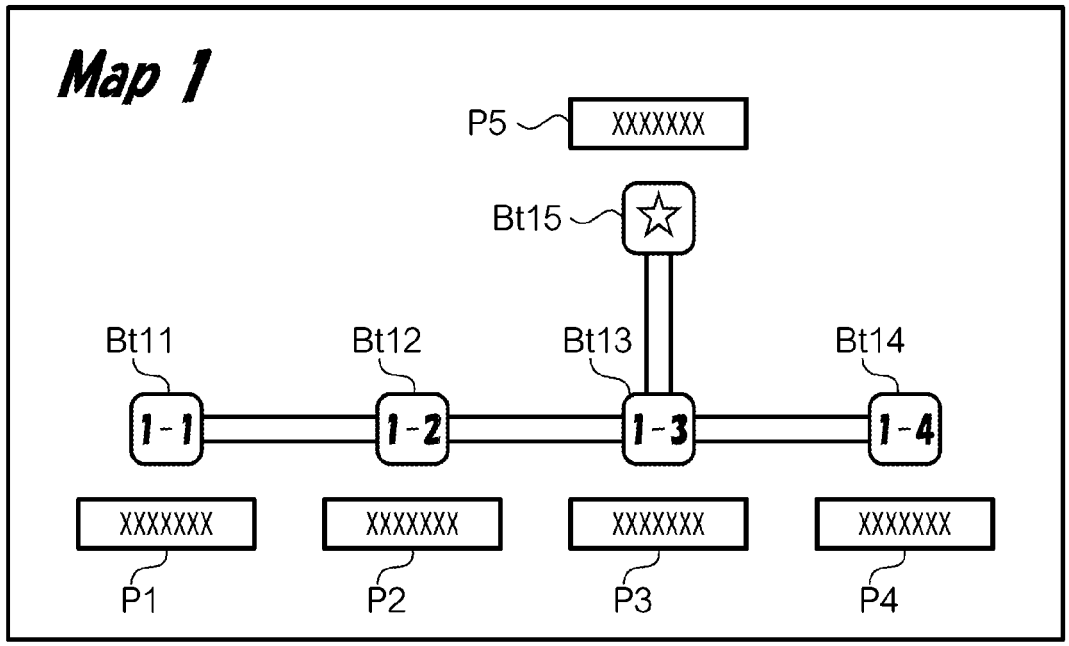
FIG. 9 shows a non-limiting example of a game screen.

FIG. 9 shows a non-limiting example of a game screen displayed in the present exemplary embodiment. The game screen shown in FIG. 9 indicates a first map titled "Map 1" displayed in an action game having plural stages. The game is assumed to have plural maps such as "Map 1, "Map 2," and "Map 3," which map has plural stages such as "Stage 1-1," "Stage 1-2," "Stage 1-3," "Stage 1-4," and "Bonus Stage," which is marked as a star in FIG. 9. A user may start a game from any stage. However, there may be in case in which, a condition is imposable on selection of a stage. For example, a condition may be imposed that a user has to pass Stage 1-1 before entering Stage 1-2. A user may play a game of a desired stage by selecting a button (Bt11, Bt12, Bt13, Bt14, or Bt15) indicative of the stage.

In the game screen shown in FIG. 9, items of posting information P1 to P5 are displayed. Each of the items of posting information P1 to P5 is displayed near a stage relevant to the posting information. In the game screen shown in FIG. 9, posting information P1 is posting information relevant to Stage 1-1, and posting information P2 is posting information relevant to Stage 1-2. The number of items of posting information is not limited to one for each stage. When posting information is displayed in a game screen, the display of information such as a comment may be omitted, unlike the display example shown in FIG. 6.

Figure 10:
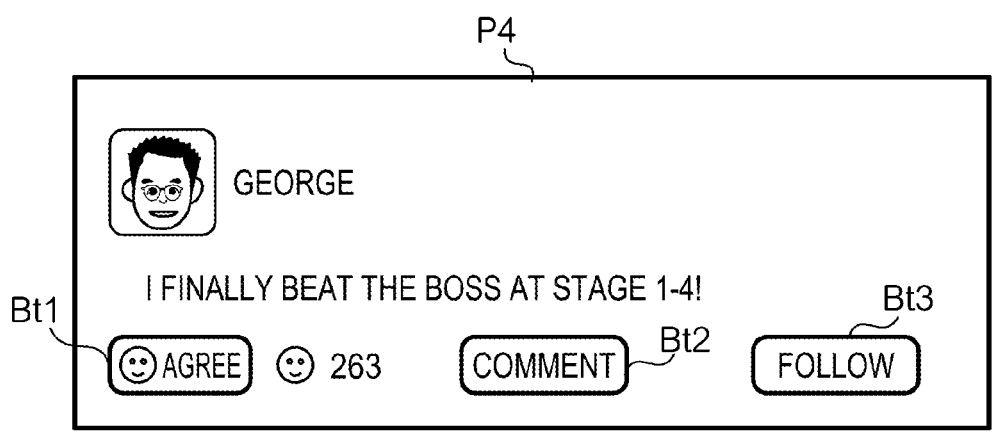
FIG. 10 shows a non-limiting example of posting information.

FIG. 10 shows a non-limiting example of posting information P4. As shown in FIG. 10, posting information P4 shows a message relevant to Stage 1-4. In the display area of posting information P4, agree button Bt1, comment button Bt2, and follow button Bt3 are displayed, as in the case of the display example shown in FIG. 6. Although not shown in FIG. 10, a topic tag indicative of Stage 1-4 is added to posting information P4. Posting information P4 is, for example, posting information posted by a user, who has played a game of Stage 1-4 shown in FIG. 9.

As described in the foregoing, in the present exemplary embodiment, a screen of a game and posting information relevant to the game are simultaneously displayed so that a user may simultaneously refer to the game screen and the posting information, without switching a screen between the game screen and a screen displaying a bulletin board for the game. A user also may make a reaction to posting information or follow a contributor by performing an input operation. Gaming system 20 and server device 100 may reflect the input operation to the information sharing service.

Figure 11:
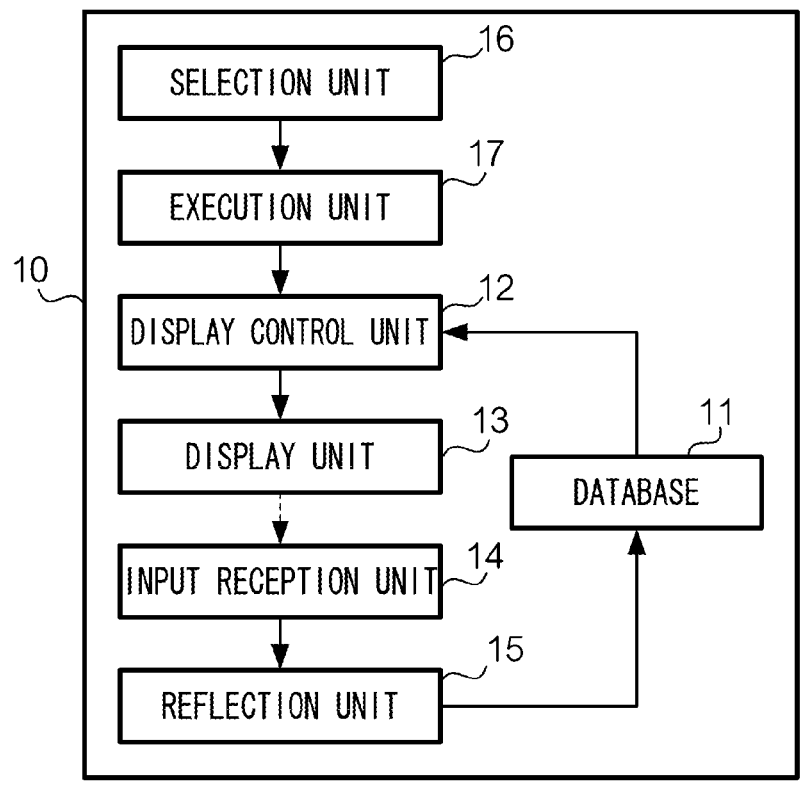
FIG. 11 shows a non-limiting example of a functional configuration of an information-processing system.

FIG. 11 shows a non-limiting example of a functional configuration of information sharing system 10. Information sharing system 10 includes functions of database 11, display control unit 12, display unit 13, input reception unit 14, reflection unit 15, selection unit 16, and execution unit 17. In information sharing system 10, the functions shown in FIG. 11 are realized by cooperation of server device 100 and gaming system 20 so that posting information may be displayed and a user's input operation may be accepted. The units shown in FIG. 11 may include units realized by a software processing.

Database 11 is a database that manages user information and posting information. Database 11 outputs user information or posting information matching a specified search condition. Database 11 may be accumulated in storage unit 120 of server device 100 or in an external storage device.

Display control unit 12 is a unit that controls display of display unit 13. Display control unit 12 acquires data from database 11, and causes display unit 13 to display an image according to the acquired data. In the present exemplary embodiment, display control unit 12 causes display unit 13 to display a screen of a game executed by execution unit 17 and posting information relevant to the game. Display control unit 12 is realized by control unit 210 of main device 200.

Display unit 13 is a unit that displays information. In the present exemplary embodiment, display unit 13 may be one of controller 300 and TV 400, or a combination of controller 300 and TV 400. Which device is caused to display which information by display control unit 12 may be determined based on a user's input operation, or may be predetermined for each game.

Input reception unit 14 is a unit that receives an input operation performed by a user. In the present exemplary embodiment, the input operation refers to an input operation performed to touch screen unit 350 or operation input unit 360. It is to be noted that input reception unit 14 may receive another input operation performed using a common input method such as speech recognition. Input reception unit 14 is realized by control unit 210 of main device 200. Input reception unit 14 acquires input operation information and coordinate information from controller 300 to recognize a user's input operation.

Reflection unit 15 is a unit that reflects a predetermined input operation received by input reception unit 14 to an information sharing service. The predetermined input operation herein refers to an input operation directed to posting information, especially posting information displayed together with a game screen. There are different types of input operations directed to posting information such as an input operation to agree to posting information, an input operation to make a comment on posting information, or an input operation to follow a contributor of posting information. Reflection unit 15 reflects an input operation in an information sharing service according to the type of the input operation. The term "reflect" herein means having an influence on user information or posting information, specifically, bringing a change to information stored in database 11. The reflection performed by reflection unit 15 may include a reflection whereby an input operation is associated with user information, and a reflection whereby an input operation is associated with posting information. The reflection performed by reflection unit 15 may include a reflection instantaneously recognized by a user, or a reflection not instantaneously recognized by a user.

Reflection unit 15 is realized by cooperation of control unit 210 of main device 200 and control unit 110 of server device 100. Control unit 210 sends data on a user's input operation to server device 100, and control unit 110 reflects the data in database 11. Accordingly, the reflection performed by reflection unit 15 may include exchanging data, and writing or updating data in database 11.

Selection unit 16 is a unit that selects one of plural games to execute the game selected. Selection unit 16 may or may not select a game according to a user's input operation. Selection unit 16 is realized by control unit 210 of main device 200.

Execution unit 17 is a unit that executes a game. Execution unit 17 reads a game program from auxiliary storage unit 220 or disk drive unit 230 to execute the game. Execution unit 17 may execute a game selected by selection unit 16. A screen of a game that has been executed by execution unit 17 is displayed by display control unit 12. Execution unit 17 is realized by control unit 210 of main device 200.

Information sharing system 10 having the foregoing functional configuration operates as described below. In the following, a processing performed between single gaming system 20 and server device 100 is described for convenience of explanation; however, actually, a similar processing may be performed between plural gaming systems 20 and server device 100.

Figure 12:
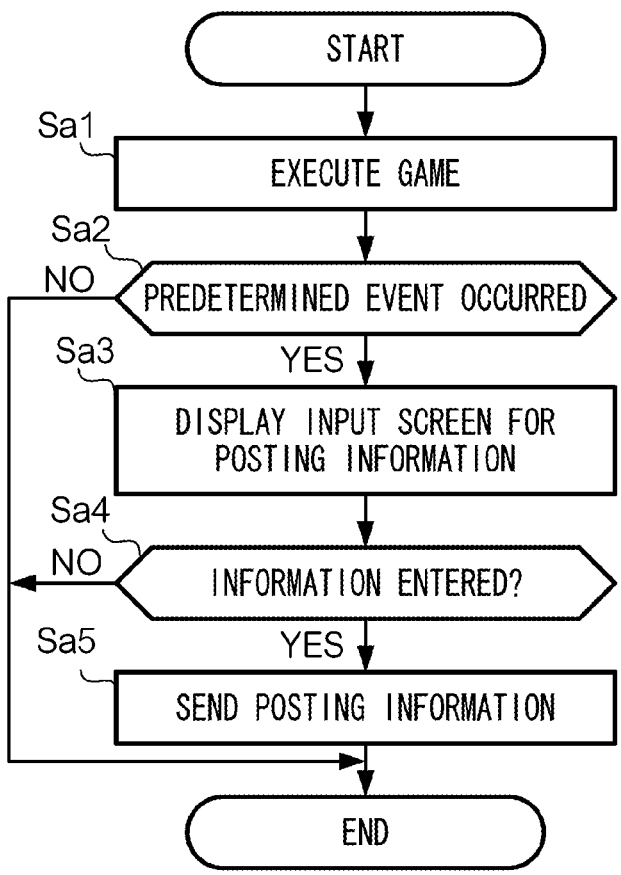
FIG. 12 shows a non-limiting example of a flowchart of a processing of sending posting information.

FIG. 12 shows a non-limiting example of a flowchart of a processing of sending posting information performed by main device 200. The sending processing shown in FIG. 12 is a processing of a during-game posting, which is one form of sending posting information. The during-game posting herein refers to posting, by a user, posting information while s/he is playing a game, and to a function of performing such a posting. The during-game posting may be performed using only controller 300 so that a user may post information while playing a game, without using different terminals. All games need not necessarily be compliant with during-game posting. During-game posting may be performed while a game compliant with during-game posting is being played.

In the sending processing, control unit 210 of main device 200 initially executes a game according to a user's input operation (step Sa1). Control unit 210 proceeds with the game according to a user's input operation, and causes controller 300 and TV 400 to change screens according to the progress of the game.

While the game is running, control unit 210 determines whether a predetermined event has occurred in the game (step Sa2). The predetermined event herein is an event to which a topic tag is assigned. The predetermined event may be defined for each game as required. The predetermined event may typically include beating a game (or a game of a certain stage), achieving a high score, and a game-over. In a case where the game is a fighting game, the predetermined event may include encountering or beating a particular opponent character such as a boss character. In a case where the predetermined event has not occurred, control unit 210 terminates the sending processing, without sending posting information.

When the predetermined event has occurred, control unit 210 displays a screen for inputting posting information to prompt the user to input posting information (step Sa3). A method in which the input screen is displayed is not particularly limited. For example, control unit 210 may cause TV 400 to display a game screen, while causing controller 300 to display the input screen. Alternatively, a dialogue box for inputting posting information, which is equivalent to the input screen, may be displayed on a game screen. The user may input characters that constitute a message body, or post a screen shot of a game screen, using controller 300. The user also, if s/he considers that his/her posting information includes a spoiler, may input characters stating that the posting information includes a spoiler.

Control unit 210 determines whether an input of posting information has been completed (step Sa4). Control unit 210 may determine that an input of posting information has been completed when a predetermined input operation such as selecting a send button has been performed. It is to be noted that since input of posting information is optional, the user may cancel the during-game posting by performing a predetermined input operation. If the user does not input posting information, control unit 210 terminates the sending processing, without sending posting information.

Control unit 210 lastly sends the posting information to server device 100 (step Sa5). When doing so, control unit 210 includes, in the posting information, a user ID, a game ID, and a topic tag, in addition to the information input by the user, and sends the posting information, using network communication unit 240. Control unit 210 may specify a game ID by identifying the game executed at step Sa1. Control unit 210 may assign a topic tag to the posting information, which corresponds to the event that occurred at step Sa2. For example, in a case where sending the posting information has been triggered by an event that the user has passed "Stag 1-1" of the game shown in FIG. 9, control unit 210 assigns a topic tag indicative of "Stage 1-1" to the posting information.

It is to be noted that control unit 210 may perform the during-game posting in a different manner. For example, control unit 210 may automatically (namely, without an input operation performed by a user) send posting information when a predetermined event has occurred. In such a case, a fixed phrase "I Passed Stage 1-1 !" or a screen shot showing the predetermined event may be used as a message body.

When server device 100 receives posting information sent in the foregoing manner, server device 100 stores the posting information. When doing so, server device 100 assigns a posting ID to the posting information to identify the posting information. Server device 100 sends, upon a request from a user, the necessary posting information to gaming system 20. In a case where a list of items of posting information of a certain community is displayed in gaming system 20, server device 100 extracts the items of posting information to send them to gaming system 20. In another case where posting information is displayed in gaming system 20 together with a game screen, server device 100 extracts the posting information associated with the game to send the posting information to gaming system 20.

Figure 13:
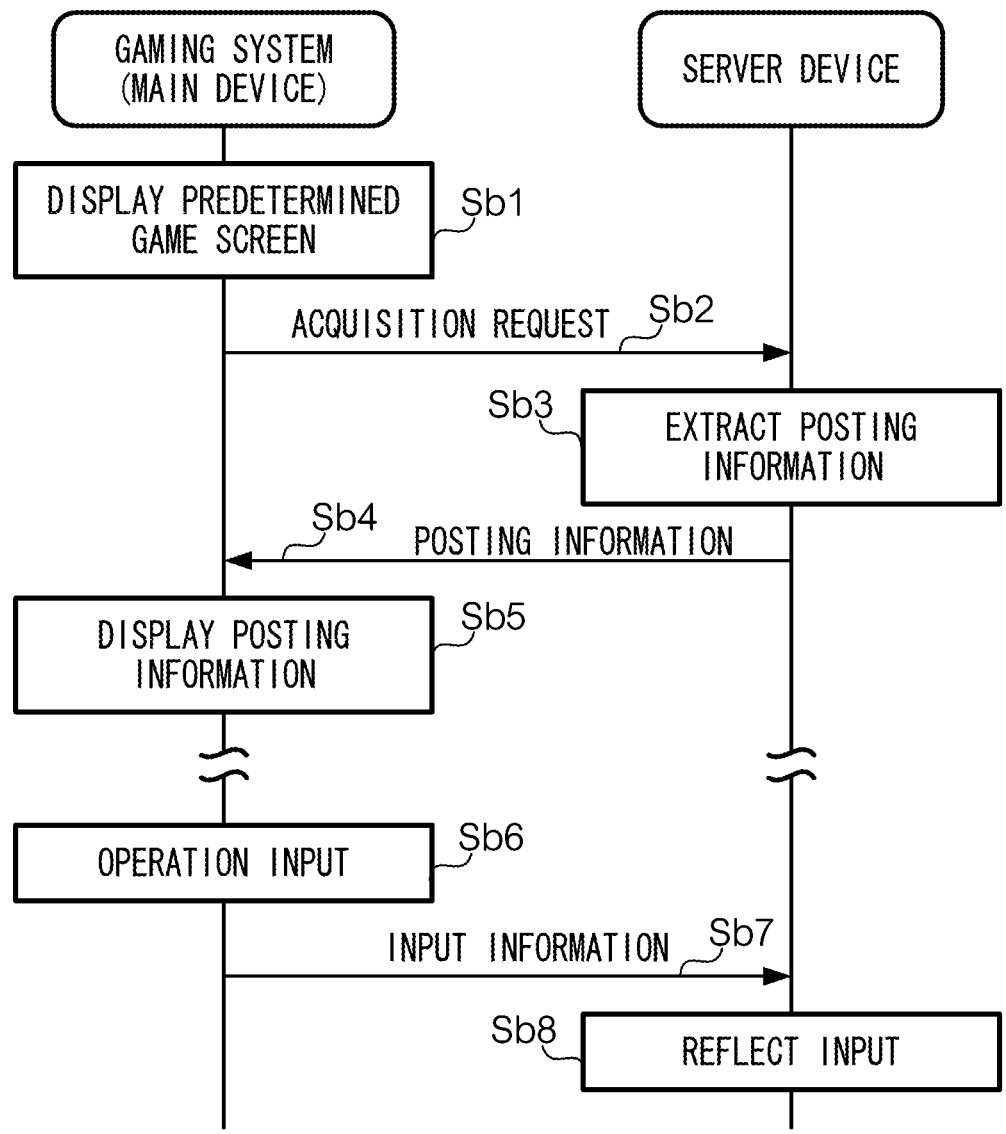
FIG. 13 shows a non-limiting example of a sequence chart of a display and reflecting processing.

FIG. 13 shows a non-limiting example of a sequence chart of a display and reflecting processing. The display processing herein refers to a processing of displaying posting information together with a game screen. Steps Sb1 to Sb5 correspond to the display processing. The reflecting processing herein refers to a processing of reflecting an input operation directed to posting information displayed by the display processing in the information sharing service. Steps Sb6 to Sb8 correspond to the reflecting processing.

In the display processing, main device 200 initially displays a predetermined game screen (step Sb1). The predetermined game screen herein refers to a game screen that is designed to be displayed together with posting information, and also is associated with a topic tag in advance. Posting information need not be displayed continuously while a game is running; in other words, posting information may be displayed for a limited time.

After displaying the predetermined game screen, main device 200 requests posting information that meets a predetermined condition (step Sb2). Hereinafter, "acquisition request." When an acquisition request is made, a game ID and a topic tag are sent. When making the acquisition request, main device 200 identifies a game ID of the running game, and identifies a topic tag corresponding to the game screen being displayed.

When server device 100 receives the acquisition request, server device 100 extracts posting information from storage unit 120 according to the acquisition request (step Sb3). Specifically, server device 100 extracts, from among all items of posting information stored in storage unit 120, items of posting information having the game ID and the topic tag indicated by the acquisition request. Subsequently, server device 100 sends the extracted items of posting information to main device 200 (step Sb4).

At step Sb3, server device 100 may exclude some items of posting information so that they cannot be displayed on a game screen. The items of posting information to be excluded may include posting information for which a predetermined time period has not passed after the posting information is posted, or posting information including a spoiler. The predetermined time period is, for example, a time period necessary for censoring posting information, which may range from several hours to one day. Censoring posting information is performed to check whether the posting information includes a spoiler or is offensive to public order and morals. According to the exclusion processing, posting information not yet subject to censorship, or posting information including a spoiler may be prevented from being displayed together with a game screen.

A determination as to which positing information should be excluded may be made in gaming system 20, not server device 100. In a case where the determination is made in gaming system 20, server device 100 may send items of posting information, whether or not subject to exclusion, to main device 200 according to an acquisition request, and main device 200 may exclude, from the items of posting information, posting information whose posting date and time is subsequent to a certain date and time, or posting information for which a spoiler flag "1" is set. Posting information to be excluded may be decided and preset by a user, who browses posting information.

When main device 200 receives the items of posting information sent in response to the acquisition request, main device 200 displays the items of posting information together with the predetermined game screen (step Sb5) so that the user may view the game screen and the items of posting information simultaneously. According to the display processing, the user is able to browse posting information that is relevant to the game being played by him/her.

When displaying the items of posting information, main device 200 displays the information items at a certain position or timing based on a topic tag. For example, main device 200, when a certain map is displayed, may display posting information relevant to the map. In another example, main device 200 may display, near a button indicative of a certain stage in a game, posting information relevant to the stage in the game (see FIG. 9). According to usage of the topic tag, the user may browse necessary or useful information with ease.

While the user browses the displayed items of posting information, s/he may perform an input operation to any one of the items of posting information. Specifically, the user may make a reaction to any one of the items of posting information, or follow a contributor of any one of the items of posting information. The reflecting processing is performed when a predetermined input operation is performed by the user after the items of posting information are displayed at step Sb5.

In the reflecting processing, main device 200 initially accepts an input operation performed by the user (step Sb6). After accepting the input operation, main device 200 identifies a type of response indicated by the input operation, specifically which of the responses, "agree," "comment," and "follow," the input operation indicates. After identifying a type of response indicated by the input instruction, main device 200 sends information on the type of response (hereinafter referred to as "input information") to server device 100 (step Sb7). The input information includes data indicative of the type of response (which data may include comments, if the type indicates a response "comment"), user ID of the user, and posting ID of the posting information, to which the input operation was performed. Based on the input information, posting information to which the input operation was performed, and a user who performed the input operation can be identified. The input information consists of information for associating the input operation and the user.

When server device 100 receives the input information, server device 100 reflects the input information in the information sharing service (step Sb8). For example, if the user's input operation indicates a response "agree," server device 100 updates the agreement information included in the posting information. In another example, if the user's input operation indicates a response "comment," server device 100 updates the comment information included in the posting information. When the agreement information is updated, the number of agreements may be incremented. When the comment information is updated, comments on the posting information may be updated. When the response "agree" is reflected in the information sharing service, server device 100 not only increments the number of agreements, but also adds information for identifying users who agreed to the posting information to the agreement information. Generally speaking, when the input operation is reflected in the information sharing service, the input operation may or may not be associated with the user.

If the user's input operation indicates a "follow" response, server device 100 updates user information to change a relationship between the user who browses the posting information and a contributor of the posting information. Specifically, server device 100 identifies user ID of the posting information (or user ID of the contributor) based on the posting ID included in the input information, identifies the user ID included in the input information, which is user ID of the user who browses the posting information, and adds the user ID of the user to follower IDs included in the user information of the contributor, so that the user becomes a follower of the contributor.

Information on which user is a follower of which user need not necessarily be notified to a user other than the users concerned. Accordingly, in a case where the user's input operation indicates a "follow" response the input operation is reflected in user information; however, the fact that the user follows the contributor need not necessarily be made known to other users. In contrast, when a user follows a contributor, such following may be notified to the users concerned (specifically, the user who follows the contributor, and the contributor to be followed). Accordingly, server device 100 may notify the followed contributor of the fact that s/he has been followed (and the follower). Server device 100 may also display information so that the followed user can be differentiated from a non-followed user. For example, server device 100 may visually differentiate posting information posted by the followed user from posting information posted by a non-followed user.

Main device 200, instead of receiving posting information at a time of displaying a certain game screen, as shown in FIG. 13, may receive posting information that may be displayed, before displaying the certain game screen. Specifically, main device 200 may collectively receive items of posting information that may be displayed, at a time of starting a game, and may selectively display posting information according to a displayed game screen.

As described in the foregoing, information sharing system 10 enables a user playing a game to browse posting information relevant to the game, which is posted using the information sharing service. Also, information sharing system 10 may reflect an input operation performed by the user directed to the posting information in the information sharing service. Accordingly, a linkage between a game and the information sharing service is enhanced so that in a case where a user of a game is a user of the information sharing service at the same time, it is expected that use of the game and the information sharing service is synergistically promoted.

Modifications

The present technology may be modified as described below, and each of the following modifications may be combined.

(Modification 1)

Posting information and a game screen may not be displayed simultaneously on a display. Main device 200, for example, may cause controller 300 to display posting information, while causing TV 400 to display a game screen, so that the posting information does not obstruct display of the game screen.

Figure 14:
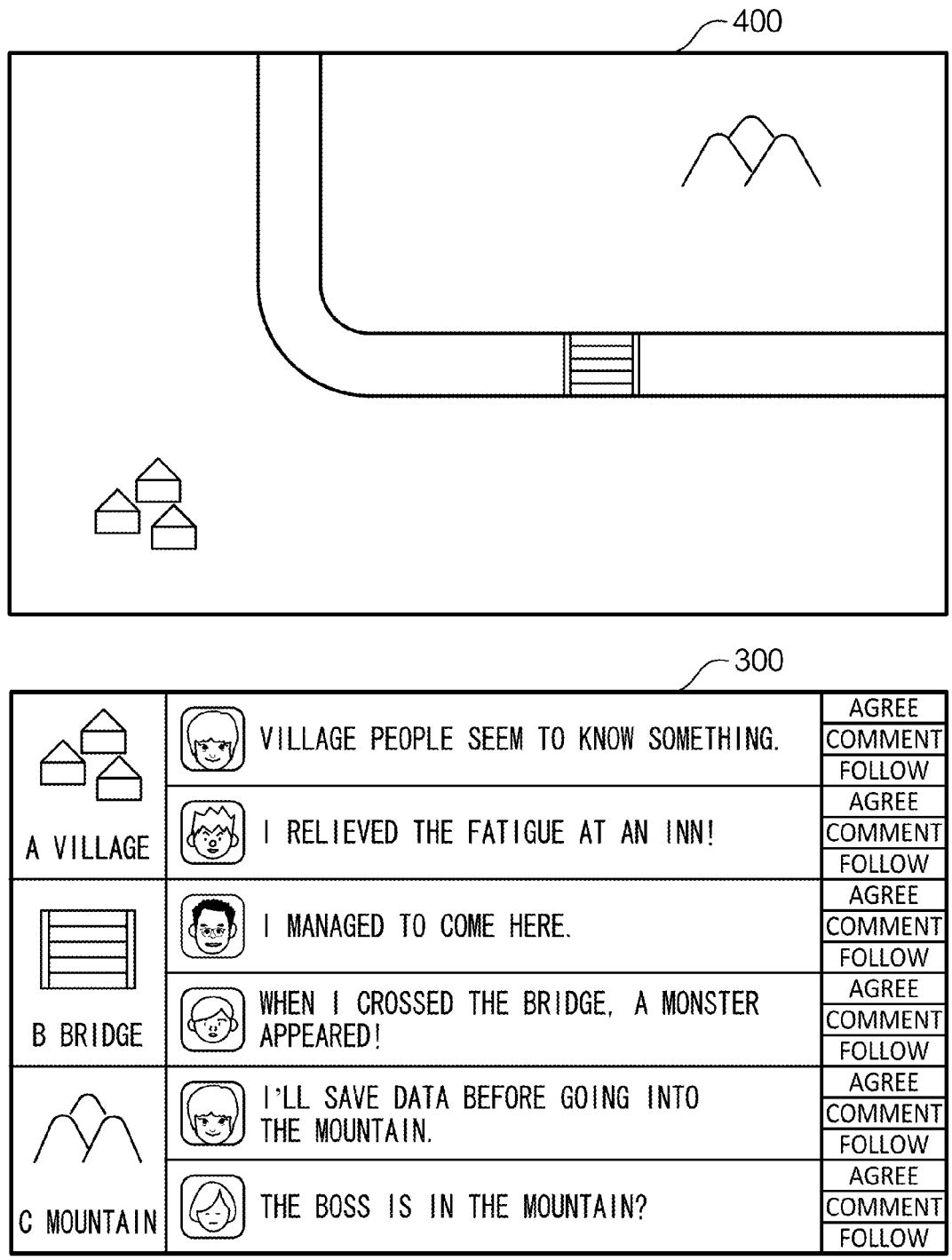
FIG. 14 shows a non-limiting example of a display of posting information and a game screen.

FIG. 14 shows a non-limiting display example of both posting information and a game screen. The game screen shown in FIG. 14 shows a map of a role-playing game, on which characteristic objects such as a village, a bridge, and a mountain are scattered. In a screen for posting information, items of posting information, each of which is associated with one of the events by a topic tag, are displayed. Each posting information is displayed in association with an icon and the name of a corresponding object.

(Modification 2)

Posting information may be browsed using a device other than gaming system 20. For example, posting information may be browsed using a personal computer or a smartphone. In a case where posting information is browsed using a device other than gaming system 20, the posting information may not necessarily be displayed together with a game screen. Also, in the case where posting information is browsed using gaming system 20, a game may not necessarily be started. In such a case, a common bulletin board listing items of posting information only may be displayed.

(Modification 3)

A position and a timing at which posting information is displayed may be determined as required. For example, main device 200 may display posting information after the elapse of a predetermined time period from when a user started playing a game (or a game of a certain stage). In such a case, a certain time period is described as a topic tag, which elapses after a user starts playing a game (or a game of a certain stage) and before posting information is displayed. In another example, where a game is played in which a character is moved by a user, main device 200 may display posting information according to the distance of movement of the character. In such a case, a certain movement distance of the character is described as a topic tag.

(Modification 4)

Posting information may not include a topic tag. Namely, in the present technology, only selective display of posting information relevant to a running game may be performed. Even if only such a selective display is performed, the present technology enables a user to browse useful posting information with ease as compared with a case where selection of posting information is not made so that posting information not relevant to a running game is displayed.

(Modification 5)

Whether a response to posting information is accepted may be selected by a contributor of the posting information. In the present technology, there may be posting information (or first posting information) to which a response from a user who browses the posting information is accepted, and posting information (or second posting information) to which such a response is not accepted. Server device 100 reflects only a response to the first posting information to an information sharing service. Main device 200 may enable a contributor who is posting information to select a type of response that can be accepted to the posted information. The contributor may accept an agreement to the posted information, while not accepting a comment on the posted information.

Alternatively, server device 100 may determine whether to accept a response to posting information based on a relationship between users or user information, instead of selection by a contributor of the posting information. For example, server device 100 may accept a reaction made to posting information by a follower of a contributor of the posting information, while not accepting a reaction made by a user, who is not a follower of the contributor. In another example, server device 100 may determine whether to accept a response to posting information based on the age or gender of a user who browses the posting information.

(Modification 6)

The term "follow" appearing in the above exemplary embodiment refers to merely an example of a relationship between users. In the present technology, a relationship may be formed between users other than the "follow" relationship. For example, in contrast to the relationship "follow," which does not require consent from a user to be followed, a relationship that requires consent of both a contributor and a user who follows the contributor.

(Modification 7)

The present technology may be applied to an application other than a game. For example, the present technology may be applied to an entertainment application other than a game, or an educational or learning support application. The present technology may be applied to an application for reproducing content with plot such as a story so that posting information may be displayed according to a situation.

(Modification 8)

The present technology may be applied to, instead of an information-processing system, a server device, an information-processing device, which is a part of main device 200, or an information-processing method. In one embodiment, an information-processing system includes: at least one processor; and an input device configured to receive an input operation performed by a user directed to posting information displayed by a display, wherein the at least one processor configured to: display first information that is displayed by executing an application on the display, and the posting information that is posted using a posting information sharing service, and that is associated with the application; and reflect the input operation received by the input device in the posting information sharing service. In another embodiment, a device according to the present technology includes: a display controller that displays on a display first information that is displayed by executing an application, and posting information that is posted using a posting information sharing service, and that is associated with the application; an input device configured to receive an input operation performed by a user directed to the posting information displayed by the display; and at least one processor configured to reflect the input operation received by the input device in the posting information sharing service. The present technology also may be applied to a program such that the program may cause a computer to provide functions of server device 100 or main device 200. The program may be downloaded to a server device via a recording medium such as an optical disk or a semiconductor memory, or via a network such as the Internet.

What is claimed is:

1. An information-processing system comprising:
   memory;
   at least one processor; and
   an input device configured to receive an input operation performed by a user directed to playing a game and posting information displayed by a display,
   the at least one processor configured to:
      execute an application for playing the game;
      receive and process input received from the input device during execution of the application for playing the game;
      receive posting information associated with the game from a server device of a posting information sharing service;
      display a screen for simultaneously displaying: (i) game information that is displayed by executing the application for playing the game on the display and (ii) the posting information that is received using the posting information sharing service that is associated with the application for playing the game;
      reflect the input operation received by the input device in the posting information;
   the game information includes first and second objects of the game, the first and second objects of the game being different from each other;
   the posting information includes first posting information that is received using the posting information sharing service and that is specifically relevant to the first object of the game and second posting information that is received using the posting information sharing service and that is specifically relevant to the second object of the game;
   the game information including the first and second objects of the game and the posting information including the first and second posting information are simultaneously displayed on the screen; and
   at least one of the first or second posting information simultaneously includes a textual message relating to at least one of the first or second objects of the game and a plurality of selectable buttons respectively corresponding to a plurality of different types of input operation regarding the textual message, the different types of input operation being performed by the user and received by the input device.

2. The information-processing system according to claim 1, wherein the posting information is associated with the application by identification information of the application.

3. The information-processing system according to claim 1, wherein a processor is included in the at least one processor, the processor being at least configured to:
   select the application for playing the game from among plural applications; and
   execute the selected application, wherein the at least one processor displays on the display the game information, which is displayed according to the application executed by the processor, and the posting information, which is associated with the application executed by the processor.

4. The information-processing system according to claim 1, wherein the at least one processor reflects the input operation directed to the posting information in the posting information sharing service so that the input operation is associated with the posting information.

5. The information-processing system according to claim 1, wherein the at least one processor reflects the input operation in the posting information sharing service so that the input operation is associated with the user.

6. The information-processing system according to claim 5, wherein the at least one processor associates the user who browses the posting information and a contributor of the posting information to form a relationship between the user and the contributor in the posting information sharing service.

7. The information-processing system according to claim 1, wherein the at least one processor displays on a display the posting information associated with the application, which posting information satisfies a predetermined condition.

8. The information-processing system according to claim 7, wherein:
   the predetermined condition defines a position or timing at which the posting information is displayed; and
   the at least one processor displays on the display the posting information that satisfies the predetermined condition at a position or timing defined by the predetermined condition.

9. The information-processing system according to claim 1, wherein the at least one processor, when the posting information is predetermined first posting information, reflects the input operation directed to the posting information in the posting information sharing service; whereas, the at least one processor, when the posting information is predetermined second posting information, does not reflect the input operation directed to the posting information in the posting information sharing service.

10. The information-processing system according to claim 1, wherein the at least one processor displays on the display the posting information, for which a predetermined time period has passed after the posting information is posted.

11. The information-processing system according to claim 1, wherein:
    the first and second objects represent first and second stages of a game, respectively.

12. The information-processing system according to claim 1, wherein:
    the first posting information is displayed near the first object of the game and second posting information is displayed near the second object.

13. A server device comprising:
a transmitter configured to send posting information to a system that displays a screen for simultaneously displaying: (i) game information that is displayed by executing an application for playing a game using user input received during execution of the application for playing the game and (ii) the posting information that is posted using a posting information sharing service and that is associated with the application for playing the game; and
a processor configured to reflect, in the posting information sharing service, an input operation performed by a user of the system, directed to the posting information sent by the transmitter; wherein
the game information includes first and second objects of the game, the first and second objects of the game being different from each other;
the posting information includes first posting information that is received using the posting information sharing service and that is specifically relevant to the first object of the game and second posting information that is received using the posting information sharing service and that is specifically relevant to the second object of the game;
the game information including the first and second objects of the game and the posting information including the first and second posting information are simultaneously displayed on the screen; and
at least one of the first or second posting information simultaneously includes a textual message relating to at least one of the first or second objects of the game and a plurality of selectable buttons respectively corresponding to a plurality of different types of input operation regarding the textual message, the different types of input operation being performed by the user.

14. An information-processing device comprising:
a processing system, including at least one processor, the processing system being at least configured to:
execute an application for playing a game;
receive and process user input during execution of the application for playing the game;
receive posting information associated with the game from a server device of a posting information sharing service;
display, on a display, a screen for simultaneously displaying: (i) game information that is displayed by executing the application for playing the game and (ii) posting information that is received using the posting information sharing service, and that is associated with the application for playing the game;
an input device configured to receive an input operation performed by a user directed to the posting information displayed by the display; and
a transmitter configured to send, to the server device, input information according to the input operation received by the input device, wherein:
the game information includes first and second objects of the game, the first and second objects of the game being different from each other;
the posting information includes first posting information that is received using the posting information sharing service and that is specifically relevant to the first object of the game and second posting information that is received using the posting information sharing service and that is specifically relevant to the second object of the game;
the game information including the first and second objects of the game and the posting information including the first and second posting information are simultaneously displayed on the screen; and
at least one of the first or second posting information simultaneously includes a textual message relating to at least one of the first or second objects of the game and a plurality of selectable buttons respectively corresponding to a plurality of types of different input operation regarding the textual message, the different types of input operation being performed by the user and received by the input device.

15. The information-processing device according to claim 14, wherein:
the first and second objects represent first and second stages of a game, respectively.

16. The information-processing device according to claim 14, wherein:
the first posting information is displayed near the first object of the game and second posting information is displayed near the second object.

17. A non-transitory storage medium that stores a program for causing a computer to provide execution comprising:
sending posting information to a system that displays a screen for simultaneously displaying: (i) game information that is displayed by executing an application for playing a game using user input received during execution of the application for playing the game and (ii) the posting information that is posted using a posting information sharing service and that is associated with the application for playing the game; and
reflecting, in the posting information sharing service, an input operation performed by a user of the system, directed to the sent posting information; wherein:
the game information includes first and second objects of the game, the first and second objects of the game being different from each other;
the posting information includes first posting information that is received using the posting information sharing service and that is specifically relevant to the first object of the game and second posting information that is received using the posting information sharing service and that is specifically relevant to the second object of the game; and
the game information including the first and second objects of the game and the posting information including the first and second posting information are simultaneously displayed on the screen; and
at least one of the first or second posting information simultaneously includes a textual message relating to at least one of the first or second objects of the game and a plurality of selectable buttons respectively corresponding to a plurality of different types of input operation regarding the textual message, the different types of input operation being performed by the user.

18. A non-transitory storage medium that stores a program for causing a computer to provide execution comprising:
executing an application for playing a game;
receiving and processing user input during execution of the application for playing the game;
receiving posting information associated with the game from a server device of a posting information sharing service;
displaying a screen for simultaneously displaying: (i) game information that is displayed by executing the application for playing the game on a display and (ii) posting information that is received using the posting information sharing service and that is associated with the application for playing the game;

receiving an input operation performed by a user directed to the posting information displayed by the display; and sending, to the server device, input information according to the received input operation, wherein:

the game information includes first and second objects of the game, the first and second objects of the game being different from each other;

the posting information includes first posting information that is received using the posting information sharing service and that is specifically relevant to the first object of the game and second posting information that is received using the posting information sharing service and that is specifically relevant to the second object of the game;

the game information including the first and second objects of the game and the posting information including the first and second posting information are simultaneously displayed on the screen; and at least one of the first or second posting information simultaneously includes a textual message relating to at least one of the first or second objects of the game and a plurality of selectable buttons respectively corresponding to a plurality of different types of input operation regarding the textual message, the different types of input operation being performed by the user.

19. The non-transitory storage medium according to claim 18, wherein:

the first and second objects represent first and second stages of a game, respectively.

20. The non-transitory storage medium according to claim 18, wherein:

the first posting information is displayed near the first object of the game and second posting information is displayed near the second object.

21. An information-processing method comprising:

executing an application for playing a game;

receiving and processing user input during execution of the application for playing the game;

receiving posting information associated with the game from a server device of a posting information sharing service;

displaying a screen for simultaneously displaying: (i) game information that is displayed by executing the application for playing the game and (ii) posting information that is received using the posting information sharing service, and that is associated with the application for playing the game;

receiving an input operation performed by a user directed to the displayed posting information; and reflecting the received input operation in the posting information sharing service, wherein:

the game information includes first and second objects of the game, the first and second objects of the game being different from each other;

the posting information includes first posting information that is received using the posting information sharing service and that is specifically relevant to the first object of the game and second posting information that is received using the posting information sharing service and that is specifically relevant to the second object of the game;

the game information including the first and second objects of the game and the posting information including the first and second posting information are simultaneously displayed on the screen; and at least one of the first or second posting information simultaneously includes a textual message relating to at least one of the first or second objects of the game and a plurality of selectable buttons respectively corresponding to a plurality of different types of input operation regarding the textual message, the different types of input operation being performed by the user.

22. The information-processing method according to 16, wherein:

the first and second objects represent first and second stages of a game, respectively.

23. The information-processing method according to 16, wherein:

the first posting information is displayed near the first object of the game and second posting information is displayed near the second object.

* * * * *